US005271317A

United States Patent [19]

Aguerrevere et al.

[11] Patent Number: 5,271,317

[45] Date of Patent: Dec. 21, 1993

[54] POTATO SLICER DEVICE

[76] Inventors: Maria S. R. Aguerrevere, Urb. Las Marías. Calle Zea Qta. Rancho Arriba. El Hatillo. Edo. Miranda.; León J. M. R. Galarraga, Urb. Prados del Este. Calle Andalucía con Alameda. Qta Milagrosa., both of, Caracas, Venezuela, 1080

[21] Appl. No.: 26,698

[22] Filed: Mar. 5, 1993

[51] Int. Cl.[5] .................... A47J 17/00; A23L 1/212; A23P 1/00; B26D 3/26

[52] U.S. Cl. .................................. 99/538; 83/404.3; 83/425.3; 83/437; 83/858; 99/537

[58] Field of Search ................ 99/495, 537, 538, 547, 99/567, 584, 588; 83/431, 437, 425.3, 404.3, 408, 856-859, 425.2, 932; 426/512, 518, 615

[56] References Cited

U.S. PATENT DOCUMENTS

| | | | |
|---|---|---|---|
| 507,383 | 10/1893 | O'Connell | 83/437 |
| 533,164 | 1/1895 | Criswell | 83/437 |
| 563,652 | 7/1896 | Bulette | 83/437 |
| 1,361,776 | 12/1920 | Rosenfeld | 99/538 |
| 1,556,053 | 10/1925 | Warren et al. | 99/538 |
| 3,112,781 | 12/1963 | Popeil | 83/437 |
| 4,062,260 | 12/1977 | Steinhogl | 83/404.3 |
| 4,537,384 | 3/1986 | Jones | 83/425.3 |
| 4,619,192 | 10/1986 | Cycyk et al. | |
| 4,644,838 | 2/1987 | Samson et al. | |
| 4,704,959 | 11/1987 | Scallen | 99/538 |
| 4,926,726 | 5/1990 | Julian | |
| 5,044,268 | 9/1991 | Lin | |
| 5,089,286 | 2/1992 | Geissler et al. | 99/537 X |
| 5,121,679 | 6/1992 | Mertz | 99/538 |

*Primary Examiner*—Timothy F. Simone
*Attorney, Agent, or Firm*—Hoffman, Wasson & Gitler

[57] ABSTRACT

An apparatus for cutting a food product, such as a potato, into bar-shaped chips or pieces including an external portion provided with a number of transverse cutting blades and an internal portion provided with a support surface containing a number of rows of expellers. The food product is placed upon the expellers and the external portion is thrust downward over the internal portion to cut the food product.

8 Claims, 7 Drawing Sheets

POTATO SLICER DEVICE

FIELD OF INVENTION

The present invention relates to a food chopper device, and specifically to a device that enables one to cut potatoes in bar-shaped chips or pieces.

PRIOR ART DESCRIPTION

Potato-chips is a popular food in many countries, including the U.S.A. as well as Europe. Generally, the process for producing potato chips consists of cutting crude potatoes previous to further frying. Several prior art devices have been utilized to slice potatoes in various manners. These prior art devices can include U.S. Pat. Nos. 4,619,192 issued to Cycyk et al; 4,704,959 issued to Scallen; 4,644,838 issued to Samson et al; 4,926,726 issued to Julian; and 5,044,268 issued to Lin. However, many of these devices are relatively complex in design, and are hard to clean, consist of more than two pieces, are costly and difficult to operate in a safe manner.

SUMMARY OF INVENTION

According to the present invention, a device for slicing potatoes in bar-shaped chips has been developed. The device has a generally square housing, composed of two pieces, including an external piece on the upper side, and an internal piece at the lower side, adjusting itself into the upper piece, and utilized as a base or prop to the surface of location. Slicer-blades, provided within the inside portion of the external piece, consisting of a series of hoops placed across or perpendicular to one another, define the size of the produced potato-chips. The lower piece, adjusting to the upper side, permits the potato to be positioned correctly inside the device, placing the potato between both internal and external pieces, which determines the zone, or area where the cutting is to be performed. Furthermore, the internal piece is internally provided with a series of expellers which conforms to the areas defined by the crossing hoops, and whose purpose is to eject the potato-chips, pulling them out over the blades, leaving the sliced potato ready for use.

The device of the present invention is easy to construct, relatively low in cost and would operate with a minimum of effort required from the user.

Furthermore, this invention introduces a new design that prevents the users from the hazardous risk of cutting themselves. The device is easy to clean and is easy to store and manipulate, due to its reduced size and weight.

BRIEF DESCRIPTION OF THE DRAWINGS

The foregoing and other objects, features and advantages of the present invention will become apparent from the following more particular description of the preferred embodiment of the invention, as illustrated in the accompanying drawings.

DESCRIPTION OF THE PREFERRED EMBODIMENT

Figure 1:
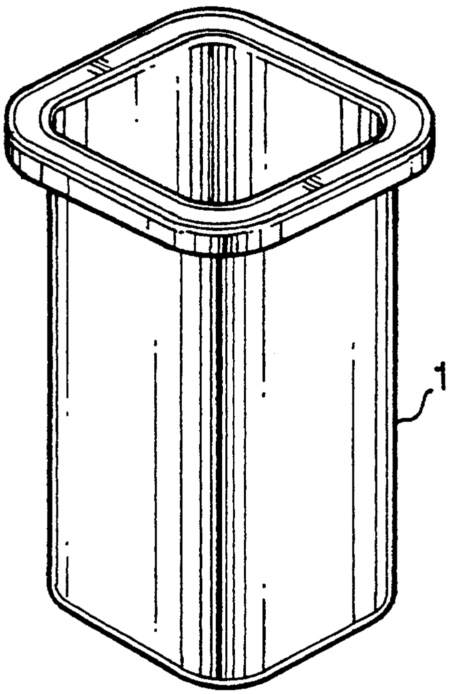
FIG. 1 is a perspective view of the external piece of the present invention.
Figure 2:
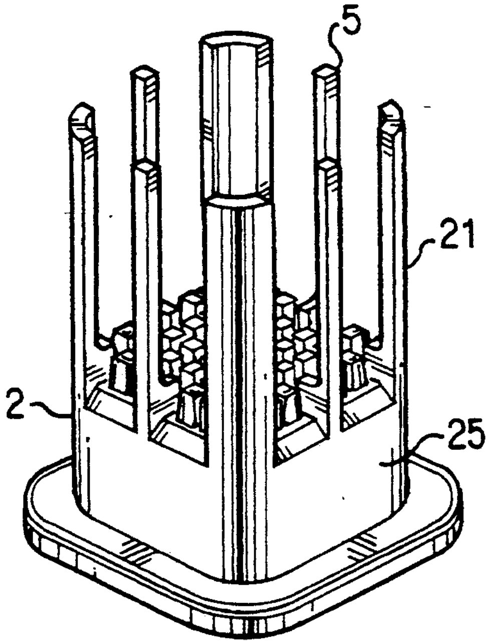
FIG. 2 is a perspective view of the internal piece of the present invention.
Figure 3:
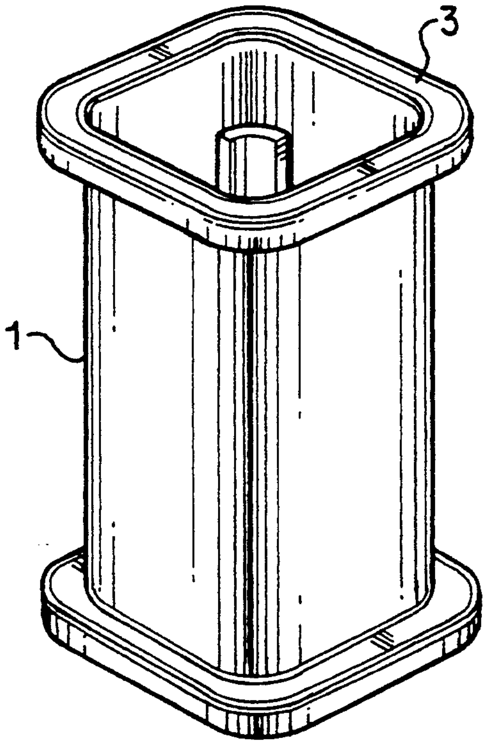
FIG. 3 is a perspective view of the present invention showing the internal piece inserted into the external piece.
Figure 4:
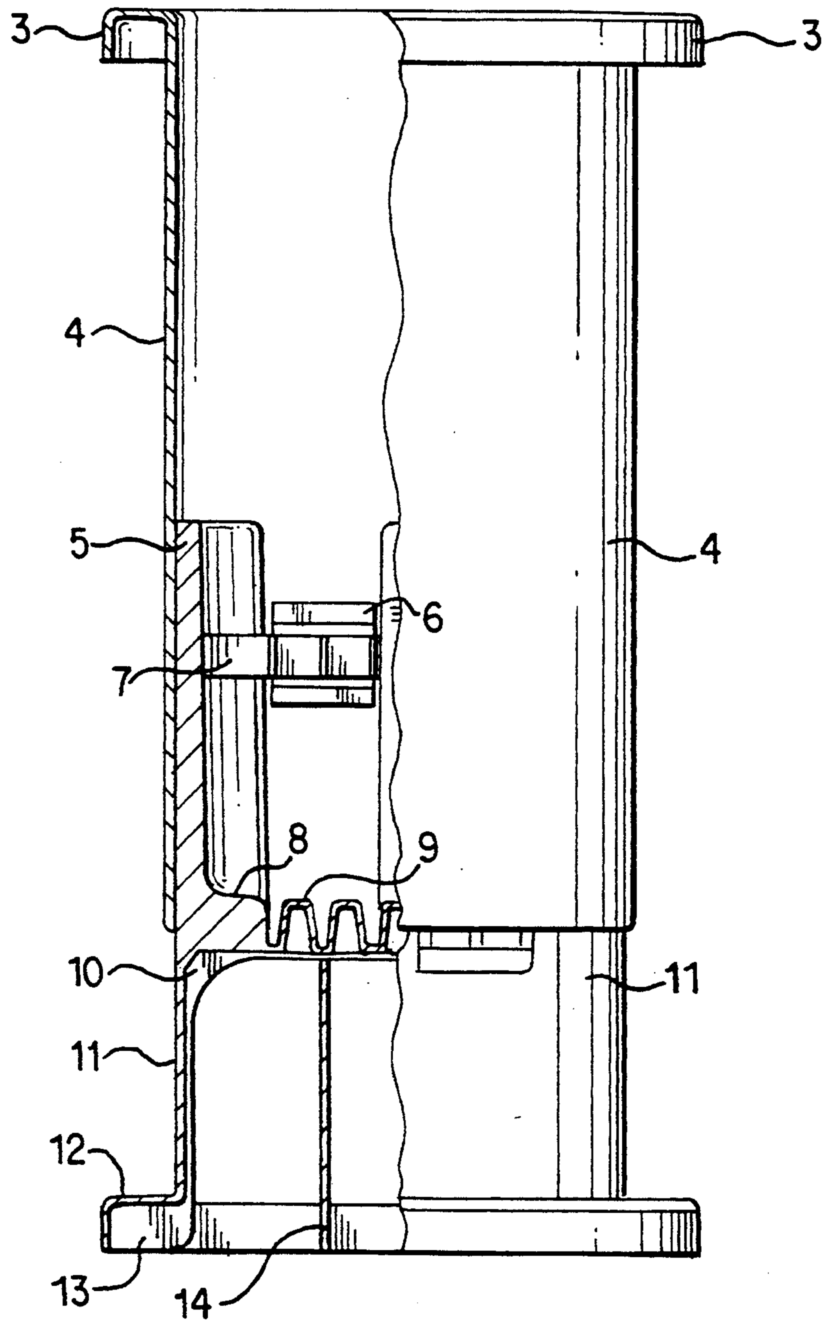
FIG. 4 is a partial cut-away view of the present invention in which the internal piece is partially inserted into the external piece.
Figure 5:
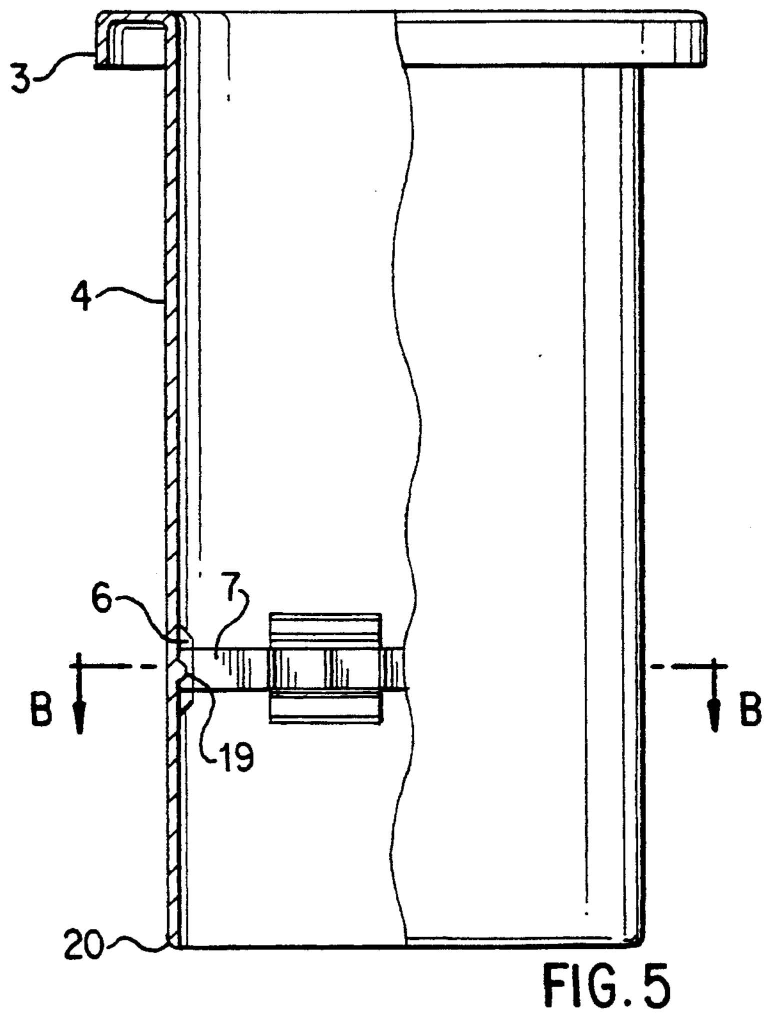
FIG. 5 is a partial sectional view of the external piece of the present invention.
Figure 6:
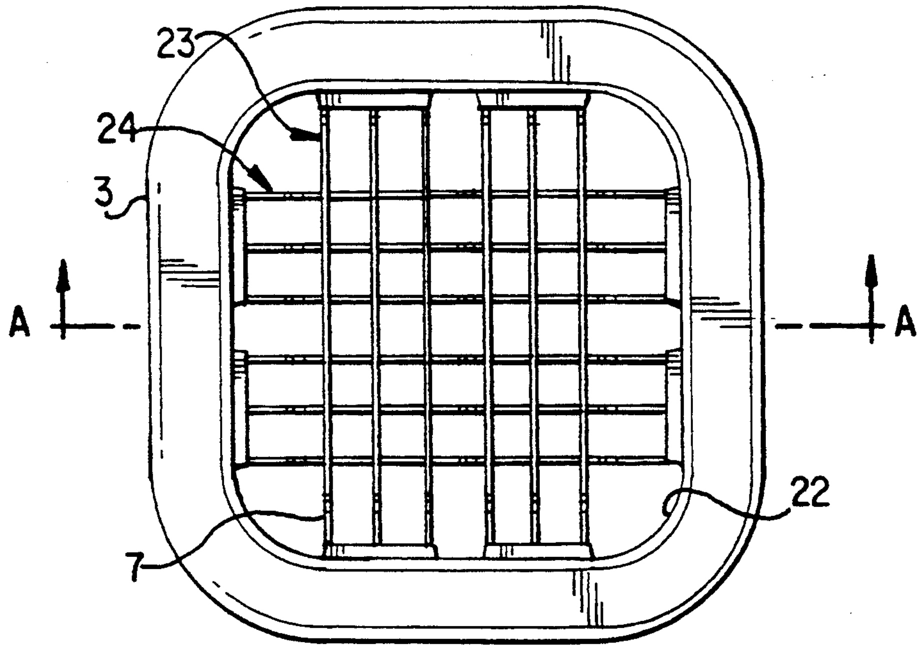
FIG. 6 is a top view of the external piece of the present invention.
Figure 7:
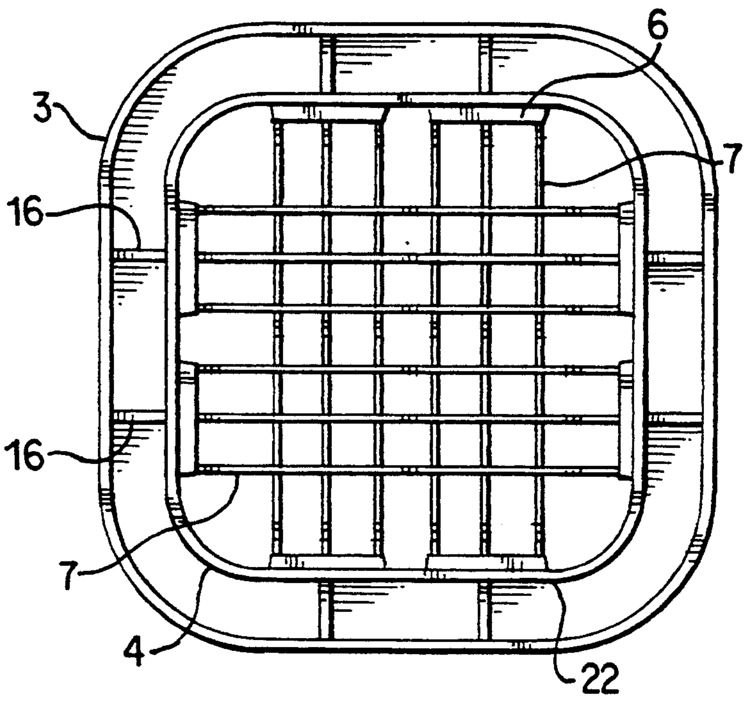
FIG. 7 is a bottom view of the external piece of the present invention.
Figure 8:
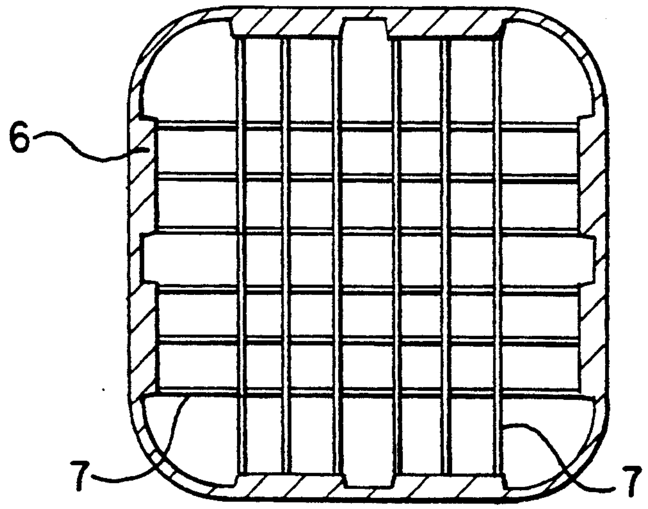
FIG. 8 is a section view of the external piece of the present invention taken through B—B of FIG. 5.
Figure 9A:
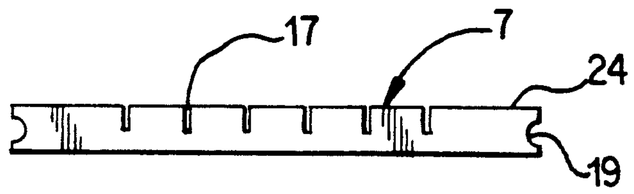
FIGS. 9A and 9B are side views of the upper and lower blades provided within the external piece.
Figure 9B:
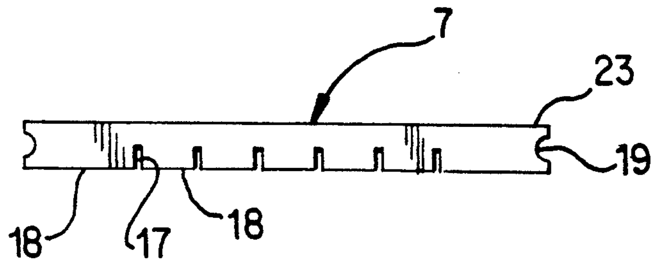
Figure 10:
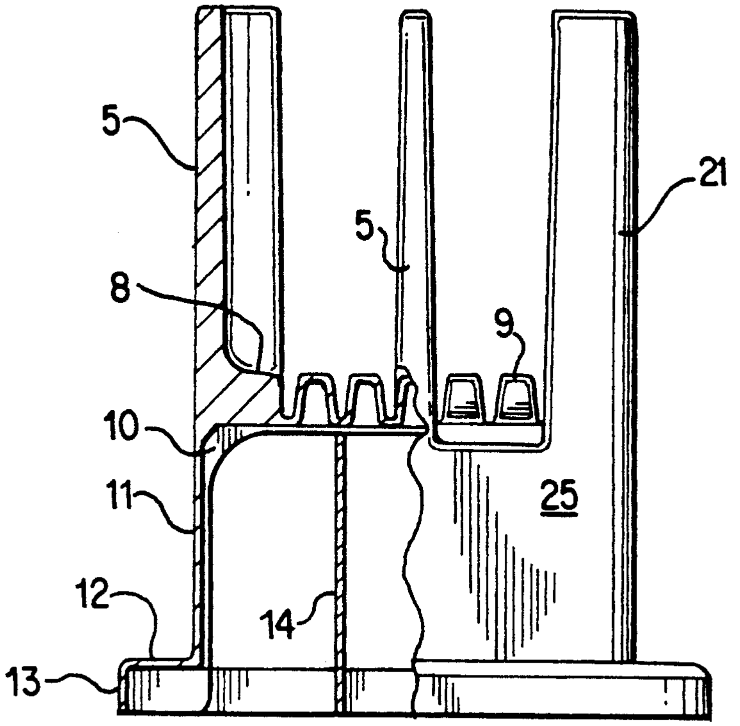
FIG. 10 is a partial sectional view of the internal piece of the present invention taken through A—A of FIG. 11.
Figure 11:
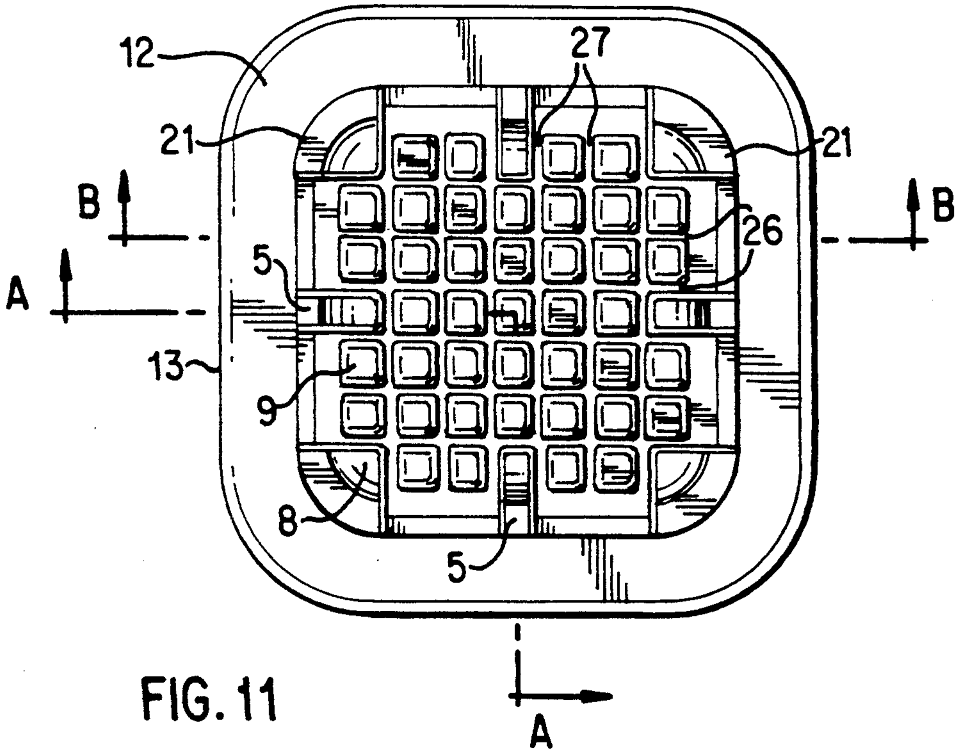
FIG. 11 is a top view of the internal portion of the present invention.

The design of the present invention includes an external piece 1 and an internal piece 2. The external piece 1 is basically composed of a square or rectangular parallelepiped structure provided with an outer wall 4 and a top lip 3 formed due to a deformation of the wall 4 by an upside down "U" shape conforming to the exterior of the external piece 1. This deformation hardens itself through ribs 16 located on the bottom side of the lip 3. The bottom portion of the external piece 1 terminates with a round bevel 20. Cutting tool 11 fastened to the internal wall surface 22 of the external piece, consists of 12 perpendicular crossing blades having a cutting surface 18 which integrate the cutting grating (see FIG. 8). These blades include six upper blades 23 and six lower blades 24 through a series of transversal sections to provide the cutting tool 7. That fitting of such a cutting grating is carried out on the inside walls 22 of the wall 4 with the assistance of wedges 6 constructed from the same material as the wall 4 which fasten the cutting tool 7 to the inside walls 22. These wedges terminate with a chamfer 19 that serves as a flat top to fasten each of the blades 23 and 24 to the interior surface 22 of the external piece 1 (see FIG. 5).

The internal portion 2 is provided with a square or rectangular body portion 25 similar in shape to the interior surface of the external portion 1. This body portion 25 includes an internal wall structure 11 and is provided upon a base 12 having a supporting strip 13 extending from the base 12. A plurality of columns 21 are provided at the corners of the base structure 25 and extend upward from the base 12 for a distance beyond the body portion 25. Positioner columns 5 are attached to the top surface of the body portion 25 by built-in expellers 8, approximately midway between the columns 21. Both the positioner columns 5 and the columns 21 extend for approximately the same distance above the top surface of the body portion 25. A plurality of expellers 9 are provided on the top surface of the body portion 25. Each of these expellers consists of block elements having side surfaces which diverge slightly from the top of the expeller 9 to the top surface of the body portion 25. The expellers 8 and 9 prop up the material to be sliced allowing the cutting tools 7 attached to the interior surface of the external portion 1 to slide to the base of these expellers 8 and 9. Longitudinal spaces 27 and latitudinal spaces 26 extend between the bases of the expellers 8 and 9 from one internal wall to its opposite internal wall.

Figure 12:
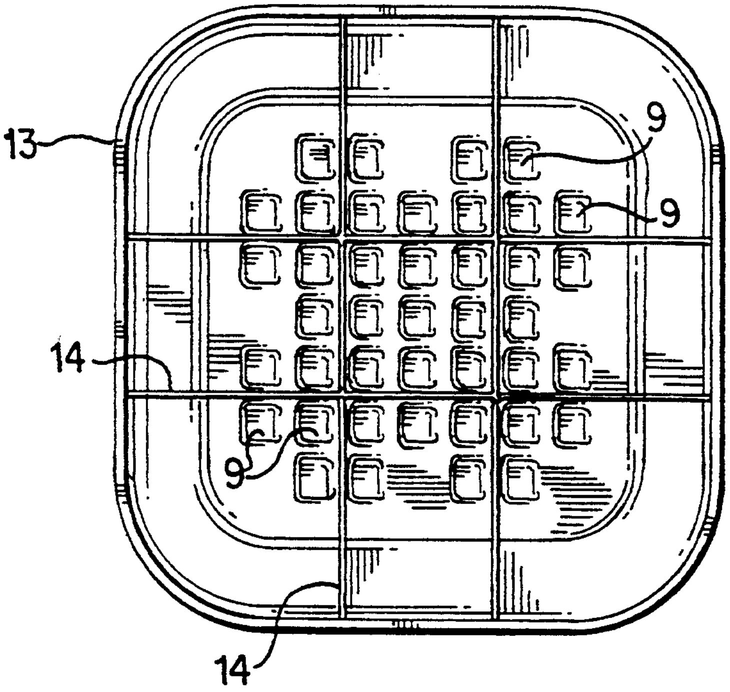
FIG. 12 is a bottom view of the internal portion of the present invention.

The interior of the body portion 25 is provided with a rib 10 extending around the periphery of the body portion 25 from the top surface of the body portion, along the internal wall 11 of the body portion terminating with the supporting strip 13. A chamfer 15 is provided on the exterior surface 11 of the wall of the internal portion 2 between the top surface of the internal body portion 25 and the side surface thereof. Additionally, a plurality of transverse ribs 14 are provided within the interior of the body portion and extend from one of the walls to a parallel wall. The purpose of these ribs 10, 14 are to provide support for the internal portion 2 when the external portion 1 provided with the cutting tools 7 is thrust downward toward the internal portion provided with a potato supported by the body portion 25 (see FIGS. 12 and 13).

Both the upper blades 23 and the lower blades 24 are provided with slits 17 allowing the upper blades 23 to be placed transverse to the lower blades 24 by inserting a portion of the blade with a slit provided on a transverse blade. The distance between each of the upper blades 23 need not be equal to one another, nor must they be equal to the distance between each of the lower blades 24 and the size of each of the potato pieces produced by such a cut would not be equal. If, however, the distance between each adjacent upper blade 23 is equal to each adjacent lower blade 24, each of the potato pieces would be equal in size and shape. Additionally, the upper blades 23 and the lower blades 24 are attached to the interior wall of the external portion 1 at a position closer to the bottom end of the external portion 1.

While the invention has been particularly shown and described with reference to preferred embodiments thereof, it will be understood by those skilled in the art that the frequency and other changes in form and details may be made therein without departing from the spirit and scope of the invention. For example, although the present invention was described as a device for producing potato pieces, any food product such as apples, pears or other fruits can be utilized.

What is claimed is:

1. A device for slicing a food product into bar-shaped pieces, comprising:
- an external portion provided with a longitudinal wall defining an internal area within said longitudinal wall;
- an internal portion provided with a support surface and a plurality of column supports arranged around the periphery of said support surface, said internal portion insertable into said internal area within said longitudinal wall of said external portion;
- a plurality of first parallel cutting blades affixed to the inside surface of said longitudinal wall of said external portion;
- a plurality of second parallel cutting blades affixed to the inside surface of said longitudinal wall of said external portion, each of said second parallel cutting blades transverse to each of said first parallel cutting blades; and
- a plurality of expeller elements located on said support surface of said internal portion for supporting the food product, said plurality of expeller elements provided in a plurality of longitudinal and latitudinal parallel rows, each of said longitudinal and latitudinal rows separated from adjacent rows by a plurality of spaces, each of said spaces aligned with one of said cutting blades;
- wherein when a food product is placed on said expeller elements and said external portion is thrust downward to enclose said internal portion within said internal area within said longitudinal wall, said plurality of first and second parallel cutting blades would cut the food product and would then pass between said plurality of expeller elements and into said longitudinal and latitudinal rows to produce a plurality of bar-shaped pieces from the food product.

2. The device in accordance with claim 1, wherein said longitudinal wall is provided with an upper portion and a lower portion, and further wherein said plurality of first and second cutting blades are affixed to said inside surface of said longitudinal wall at a position closure to said lower portion than said upper portion.

3. The device in accordance with claim 1, wherein the distance between each of said first parallel cutting blades is equal to the distance between each of said second parallel cutting blades, thereby producing a plurality of pieces from the food product of equal size and shape.

4. The device in accordance with claim 1, wherein said longitudinal wall is a rectangular parallelepiped.

5. The device in accordance with claim 1, wherein said longitudinal wall is a square parallelepiped.

6. The device in accordance with claim 1, wherein said internal portion is provided with a base supporting said support surfaces and each of said column supports extending from said base to a distance above said support surface.

7. The device in accordance with claim 1, further including a plurality of ribs extending upward from said support surface.

8. The device in accordance with claim 6, further including a plurality of ribs extending upward from said support surface.

* * * * *